United States Patent

[11] 3,633,017

| [72] | Inventor | Arthur W. Crooke<br>Concord<br>Michael E. Hanna, Jr.<br>W. Roxbury, both of, Mass.; |
|---|---|---|
| [21] | Appl. No. | 1,090 |
| [22] | Filed | Jan. 7, 1970 |
| [45] | Patented | Jan. 4, 1972 |
| [73] | Assignee | Sperry Rand Corporation |

[54] DIGITAL WAVEFORM GENERATOR
20 Claims, 2 Drawing Figs.

[52] U.S. Cl. .................................................. 235/156,
340/172.5, 235/152, 235/197
[51] Int. Cl. ........................................................ G06f 7/385,
G06f 15/34
[50] Field of Search ............................................ 340/172.5,
347; 235/156, 197, 152

[56] References Cited
UNITED STATES PATENTS

| 3,110,802 | 11/1963 | Ingham et al. ................ | 235/197 |
| 3,205,349 | 9/1965 | Bryan et al. ................... | 235/197 |
| 3,358,129 | 12/1967 | Schultz ......................... | 235/197 X |
| 3,457,395 | 7/1969 | Wisniewski ................... | 235/197 X |
| 3,497,625 | 2/1970 | Hileman et al. ............... | 340/347 X |
| 3,569,684 | 3/1971 | Burnett ........................ | 235/152 |

*Primary Examiner*—Eugene G. Botz
*Assistant Examiner*—James F. Gottman
*Attorney*—S. C. Yeaton

ABSTRACT: A digital waveform generator for providing digital waveforms particularly of the sinusoidal type. The invention comprises means for providing a sequence of digital numbers whose values vary in accordance with the phase versus time function of the sinusoidal waveform to be generated. The function of time may be linear or nonlinear in accordance with the desired waveform. The sequence of numbers is utilized to address a digital memory wherein is stored the digital sinusoidal functional values corresponding to the digital phase values. As the sequence of phase numbers addresses the memory in accordance with the function of time, the corresponding sequence of sinusoidal numbers are provided by the memory, thus generating the desired digital waveform. Two embodiments are disclosed, one of which utilizes two registers for controlling the frequency and phase, respectively, of the output waveform. The other embodiment utilizes a difference equation computer to approximate the phase function by a recursively generated polynomial function of time.

3,633,017

DIGITAL WAVEFORM GENERATOR

The invention herein described was made in the course of or under a contract or subcontract thereunder with the Department of the Navy.

BACKGROUND OF THE INVENTION

1. Field of the Invention

The invention pertains to digital waveform generators particularly of the sine and cosine generator type.

2. Description of the Prior Art

Digital waveform generators are known which provide sequences of digital signals representative of numbers. The numbers of a sequence may vary in accordance with a desired function of time. For example, the values of the numbers may increase and decrease in a sinusoidal fashion thus providing a digital sinusoidal waveform. The corresponding analog sinusoid may be obtained by converting the sequence of numbers into a sequence of analog voltages by means of a conventional digital-to-analog converter. The converter output may be smoothed by an analog filter thus providing the desired analog counterpart of the digital waveform. A conventional digital waveform generator for providing digital sine and cosine signals is described on pages 146–149 of "Digital Processing of Signals" by B. Gold and C. Rader published by McGraw-Hill Book Company. This prior art waveform generator has the disadvantage that four multiplications are required for each point of the output waveform thus requiring excessive time per iteration and hence limiting the highest frequency that the device can provide. In addition, the round-off errors associated with this prior art device accumulates as the output waveform is recursively generated, hence introducing error that increases without bound. This effect may be obviated by periodic resetting when the error attains a value detrimental to the functioning of the system in which the generator is included, hence requiring additional equipment. Another disadvantage of the cited generator is that the frequency of the output waveform is a trigonometric function of the input signals applied thereto. Thus instrumentations of this prior generator for providing frequency modulated waveforms may be difficult to realize. In addition, phase modulation of the output waveform may be particularly difficult to achieve.

Prior art generators of the type described are primarily designed to provide single frequency sinusoidal output waveforms. The prior devices are not readily adaptable to generate sinusoidal output waveforms of the frequency and phase modulated type. Such waveforms are particularly useful in radar, sonar and communication systems.

SUMMARY OF THE INVENTION

The present invention comprises a digital waveform generator for providing digital waveforms including complex sinusoids of the frequency, phase and amplitude modulated types.

The invention includes means for providing a sequence of digital numbers whose respective values vary in accordance with the phase versus time function of the sinusoidal waveform to be generated. The function of time may be linear or nonlinear in accordance with the desired waveform. The sequence of numbers are utilized to address a digital memory wherein is stored the digital sinusoidal functional values corresponding to the digital phase values. As the sequence of phase numbers addresses the memory in accordance with the function of time, the corresponding sequence of sinusoidal numbers are provided by the memory, thus generating the desired digital waveform.

Two embodiments of the invention are disclosed. In one embodiment of first register stores a digital number representative of the initial frequency of the waveform to be generated. The output of the register is combined with a digital number whose value varies in accordance with the desired frequency modulation to be imparted to the output waveform of the device. An accumulator register accumulates the numbers thus combined. A second digital number, whose value is controlled in accordance with the phase modulation function to be imparted to the output waveform, is combined with the output signals from the accumulator. The sequence of numbers thus provided is utilized to address a digital memory in the manner previously described therefore providing the desired digital sinusoid. The output waveform may be amplitude modulated by multiplying the signals provided by the memory by digital numbers in accordance with the amplitude modulation function to be imparted thereto.

The second embodiment of the invention comprises a difference equation computer for approximating the phase function of the desired output waveform by means of a recursively generated polynomial function of time. The difference equation computer comprises a plurality of cascade connected accumulators into which an initial value of the polynomial and the differences of the initial value of successively increasing order are inserted respectively. By cascaded accumulation of the numbers in the accumulators, successive points of the approximating polynomial are generated. The output of the difference equation computer is utilized to address a digital memory in the manner previously described thus providing the desired digital waveform. An interpolator may be included between the output of the difference equation computer and the digital memory in order to reduce the computational rate of the accumulators and to decrease the round-off error associated with the device.

It will become clear hereinafter that the disadvantages inherent in prior configurations, as discussed above, are obviated by the present invention.

DESCRIPTION OF THE PREFERRED EMBODIMENTS

Figure 1:
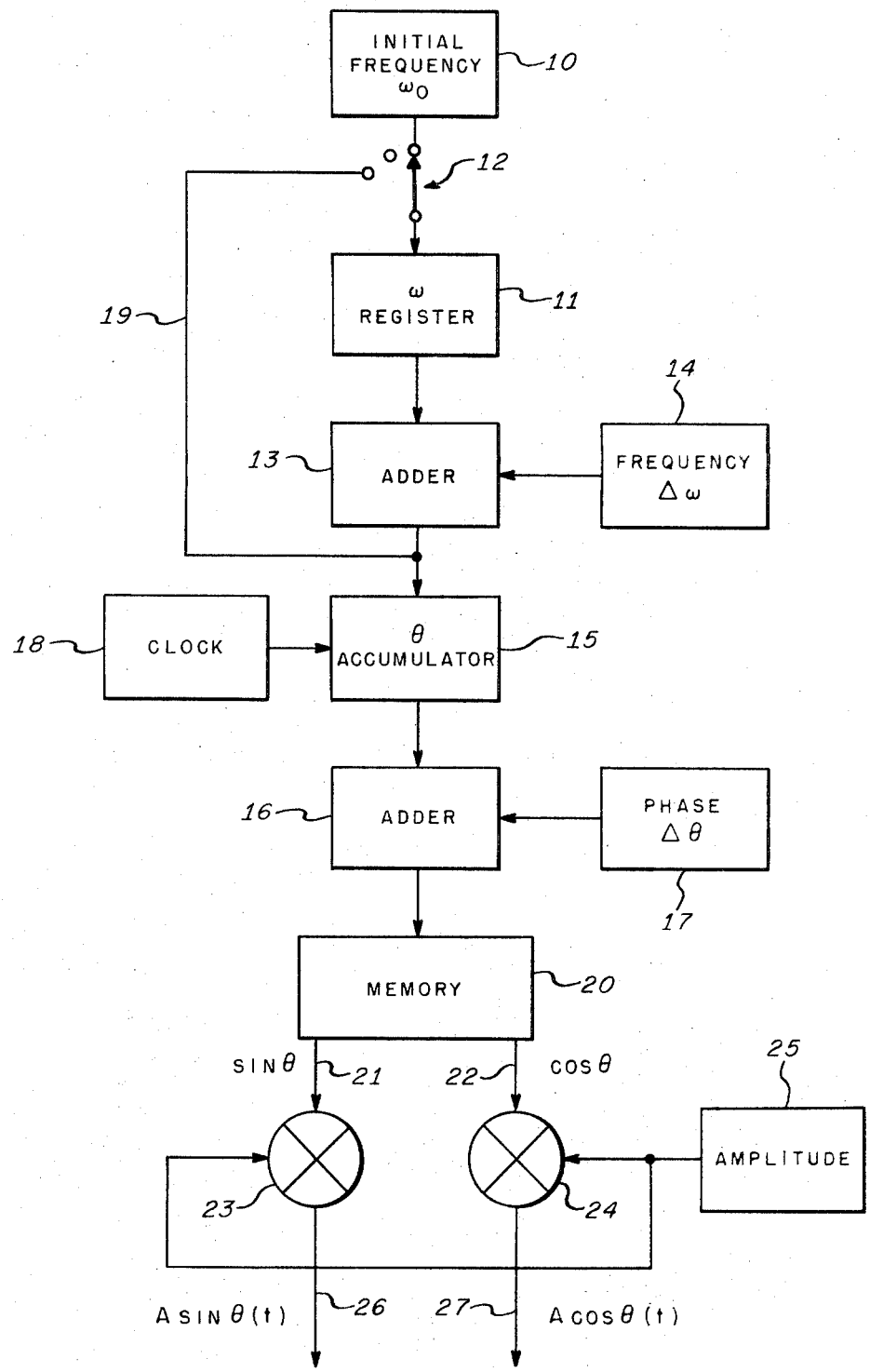
FIG. 1 is a block schematic diagram illustrating a digital waveform generator embodying the principles of the present invention and FIG. 2 is a block schematic diagram illustrating a second embodiment of the present invention.

Referring to FIG. 1, an embodiment of the invention is illustrated wherein the phase and frequency of the output sinusoid are separately modulated by two sources of digital numbers, $\Delta\theta$ and $\Delta\omega$, respectively.

A source 10 provides a digital number $\omega_0$ representative of the initial frequency of the output waveform. The number $\omega_0$ is inserted into a register 11 in any convenient manner via a three-position switch 12. The register 11 and the source 10 may be comprised of digital circuits of the types well known in the digital electronics art. The number in the register 11 is applied as an input to a conventional digital adder 13. The other input to the adder 13 is provided by a source of digital numbers 14. The source 14 provides a sequence of numbers whose values vary as a function of time in accordance with the frequency modulation characteristics desired for the output waveform in a manner to be described. The sequence of numbers provided by the source 14 may be generated, in a conventional manner, by a general purpose digital computer programmed to compute the desired function and stored thereafter on magnetic tape, cards, or the like, for application to the adder 13. The adder 13 and the source 14 comprises means for varying the number stored in the register 11 in accordance with the aforementioned function of time.

By means of a feedback connection 19 between the output of the adder 13 and the input to the register 11 via a tap of the switch 12, the register 11 and the adder 13 may be utilized as an accumulator for the convenience of generating the desired function of time.

The numbers of the sequence provided by the source 14 are added to the numbers provided by the register 11 in the adder 13 thus providing a sequence of digital numbers as an input to a digital accumulator 15. The accumulator 15 may be of a conventional type wherein a number applied thereto is added to the number already stored therein at a rate controlled by a fixed frequency clock source 18. The accumulator 15 provides a sequence of numbers representative of the phase versus time function of the desired output waveform in response to the accumulation of the sequence of numbers provided by the adder 13 in a manner to be explained.

The phase function thus generated may be modulated by means of an adder 16 to which the output of the accumulator 15 is applied as an input. The other input to the adder 16 is provided by a source of digital numbers 17. The source 17 provides a sequence of numbers whose values vary as a function of time in accordance with the phase modulation characteristics desired for the output waveform in a manner to be described. The sequence of numbers provided by the source 17 may be generated in a conventional manner similar to that described with respect to the source 14. The adder 16 and the source 17 comprise means for varying the number provided by the accumulator 15 in accordance with the aforementioned function of time.

The numbers of the sequence provided by the source 17 are added respectively to the numbers of the sequence provided by the accumulator 15 in the adder 16 thus provided a sequence of digital numbers as an input to a memory 20. The memory 20 may comprise a conventional addressable digital memory of the read-only variety which stores a table of sine and cosine functional values corresponding to incremental values of phase. For example, the table may store values of sine $\theta$ and cosine $\theta$ at increments of $\pi/128$ in the range of $\theta$ between 0 and 2 $\pi$. The memory locations at which the sine and cosine values are stored are addressable as a function of $\theta$. For example, when $\theta=0$, a memory location for sine 0 is addressed that contains the number zero. Similarly a memory location for cosine 0 is addressed that contains a number representative of unity. These numbers are provided on leads 21 and 22 respectively in response to the input address of zero to the memory 20 in a conventional manner. In a similar manner, when a digital number having a value of $\pi/2$ is applied to the addressing input of the memory 20, digital numbers having values of sine $\pi/2$ and cosine $\pi/2$ appear on the leads 21 and 22, respectively.

It may be understood that the memory 20 includes conventional addressing registers and decoders as well as reading and sensing circuits which have not been shown for clarity.

The digital outputs of the memory 20, appearing on the leads 21 and 22, may be applied as inputs to digital multiplies 23 and 24, respectively. The multipliers 23 and 24 function to control the amplitude of the digital waveform provided by the memory 20 by multiplying the digital numbers comprising the waveform by digital constants provided by a source 25, thus generating the desired digital output waveform signals on leads 26 and 27 in a manner to be explained.

In the operation of the device illustrated in FIG. 1, a sign frequency digital sine wave, for example, may be generated. The sine wave may have a frequency of $\omega_0$ and an initial phase relationship with respect to time. To operate the device in the single frequency mode, the digital number representative of the frequency $\omega_0$ is transferred to the register 11 from the source 10 via the switch 12. After the transfer is accomplished, the switch 12 may be positioned to its open tap. In order to generate the desired sinusoid of frequency $\omega_0$ the numbers provided by the sources 14 and 17 should have values of zero. Thus the number $\omega_0$ is accumulated in the accumulator 15 via the adder 13 at a fixed rate controlled by the clock source 18. Therefore the output of the accumulator 15 is a sequence of numbers increasing in a linear fashion, each number being larger than the preceding number by an amount $\omega_0$. The accumulator 15 may be so arranged that the maximum number that it will hold before overflow occurs will provide the address of one bit less than $2\pi$ to the memory 20. Thus during operation in the mode described, the accumulator 15 continuously provides a sequence of numbers that increases linearly from zero to 2 $\pi$ periodically resetting back to zero at the overflow thereof. This sequence of numbers provides a phase function to the addressing input to the memory 20 in response to which the memory 20 provides a sequence of numbers on lead 21 continuously varying from sine 0 to sine 2 $\pi$ in a sinusoidal manner. Thus a digital sine wave of frequency $\omega_0$ having a reference phase of $\theta_0$ is generated. Similarly, a digital cosine wave is provided on the lead 22.

It may now be appreciated that if the source 14 provides a nonzero digital constant $\Delta\omega$ to the adder 13, the frequency of the digital output sinusoid will increase by an amount linearly proportional to $\Delta\omega$.

It may similarly be appreciated that if the source 17 provides a nonzero digital constant $\Delta\theta$ to the adder 16, the phase of the digital output sinusoid will be displaced from the reference phase by an amount linearly proportional to $\Delta\theta$.

Hence it may now be understood that complex digital sinusoids may be generated by the apparatus illustrated in FIG. 1 by varying the values of the numbers of the sequences provided by the sources 14 and 17 as functions of time, respectively. For example, a linearly swept frequency modulated digital waveform may be generated by varying $\Delta\omega$ as a linear function of time. Alternatively, the source 14 may provide a constant value of the switch 12 positioned to connect to the feedback path 19. Other digital sinusoids may efficaciously be provided by appropriate choices of the time functions associated with the $\Delta\omega$ and $\Delta\theta$ sources 14 and 17, respectively. The feedback connection 19 may conveniently be utilized in the generation of these waveforms.

It may be appreciated that it is convenient to address the memory 20 in modulo 2 $\pi$ fashion. That is, the phase function should vary from zero to 2 $\pi$ in order to generate one sinusoidal cycle and should return to zero in order to initiate the generation of the next occuring cycle. As previously mentioned, the accumulator 15 overflows after accumulating a number representative of 2 $\pi$. Therefore, ignoring the overflows from the accumulator 15 is equivalent to subtraction of multiples of 2 $\pi$ from the phase function hence conveniently achieving the desired modulo 2 $\pi$ addressing of the memory 20.

It may now be appreciated that the present invention obviates the disadvantages of the prior art as previously discussed. The arithmetic operations required for each iteration of the present invention are additions rather than the more complex multiplications required in the prior devices. Since round-off is required only for addressing and readout of the memory 20, no accumulation of errors is incurred. The input parameters $\Delta\omega$ and $\Delta\theta$ are linear functions of the frequency and phase, respectively, of the output waveform rather than trigonometric functions as the prior configurations.

Figure 2:
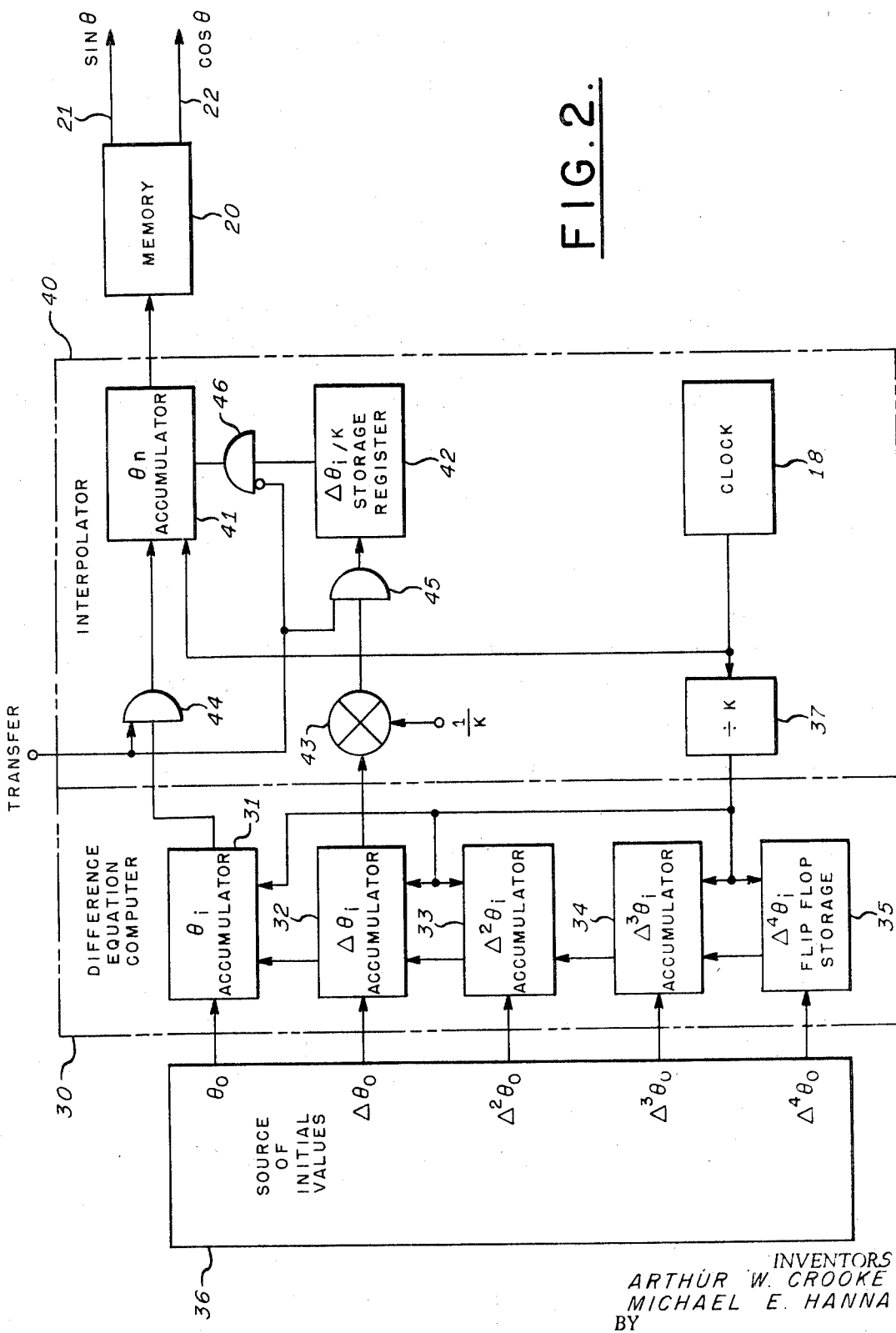

Referring now to FIg. 2 in which like reference numerals indicate like components with respect to FIG. 1, an alternative embodiment of the invention is illustrated wherein a difference equation computer 30 provides the required digital phase function to the addressing circuits of the memory 20. The difference equation computer 30 performs computations which recursively generate the points of a polynomial function of time. The polynomial function is chosen to closely approximate the desired phase function associated with the waveform to be generated. The polynomial approximation may be derived by an conventional method such as a Taylor series expansion of the phase function. The difference equation computer 30 comprises a plurality of accumulators 31—35 connected in cascade configuration. The number of accumulators required in the cascade chain is dependent upon the order of the polynomial chose to approximate the phase function. The difference equation computer 30 is illustrative of circuits that approximate polynomials of the fourth order, for example. The mathematical theory underlying the recursive generation of the points of the approximating polynomial may be understood from the discipline of finite difference theory as discussed on pages 183-185 of the textbook "Numerical Calculus " by W. E. Milne published by the Princeton University Press of Princeton, New Jersey.

The difference equation computer 30 comprises the accumulator 31 whose output provides the desired phase function to the memory 20. The output of an accumulator 32 is coupled as an input to the accumulator 31 whereby the number stored in the accumulator 32 is added to the number stored in the accumulator 31. In a similar manner an accumulator 33 is coupled to the accumulator 32 so that the number stored therein may be added to the number stored in the accumulator 32. In a similar manner, accumulators 34 and 35 are connected to the accumulators 31, 32 and 33 in cascade configuration. It may be understood from the teachings of numerical calculus that in the generation of polynomial functions, the first accumulator 35 in the cascade configuration may be a register for storing a constant value.

The accumulators of the difference equation computer are preset to initial values in accordance with the particular polynomial to be generated by a source of initial value numbers 36. The accumulator 31 is preset with the value of an initial point $\theta_0$ of the polynomial. The accumulator 32 is preset with an initial value of the first corresponding to the point $\theta_0$. The accumulators 33, 34 and 35 are preset with initial values of the second, third and fourth differences corresponding to the point $\theta_0$, respectively. It may be appreciated that in the embodiment illustrated in FIG. 2 for fourth order polynomials, the fourth difference is a constant.

The clock signal from a clock source 18 is applied via a frequency divider 37 to control the arithmetic operations of the accumulators 31-35. The frequency divider 37 diminishes the frequency of the clock signal by a factor of K for reasons to be described later.

In the operation of the difference equation computer 30, the accumulator 31 provides the initial point of the phase function to the addressing circuits of the memory 20. During the first iteration of the computer 30 the fourth difference stored in the register 35 is added to the initial third difference stored in the accumulator 34. The combined third and forth differences are then added to the initial second difference stored in the accumulator 33 and the combined number stored therein is added in cascade fashion to the numbers stored in the accumulators 32 and 31. Hence at the end of the first iteration the second point of the polynomial phase function is provided by the accumulator 31 to the memory 20 in accordance with the teachings in the cited Milne reference. In this manner the points of the approximating polynomial are generated in recursive fashion under control of the clock source 18.

It may be understood that the additions of the numbers in the accumulators 31-35 may be performed in the reverse order to that described above. The number in the accumulator 32 may be added to the number in the accumulator 31. The number in the accumulator 33 may be added to the number in the accumulator 32 and so on in cascade fashion.

The memory 20 functions to provide digital sine and cosine waveforms in response to the points of the phase function provided by the accumulator 31 in a manner identical to that described with respect to FIG. 1.

As an illustrative example of the operation of the apparatus illustrated in FIG. 2, a single frequency digital sine wave may be generated. This is accomplished when the computer 30 provides a linear phase function of time. A linear phase function may be provided by presetting the accumulators 31 and 32 to an initial value of the function and to a number representative of the desired frequency, respectively, and by setting the remaining accumulators to zero.

As a further illustrative example of the operation of the apparatus of FIG. 2, a digital linearly swept frequency modulated waveform may be provided by the recursive generation of a quadratic phase function of time. A quadratic phase function may be provided by presetting the accumulators 31, 32 and 33 to an initial value of the function, to a number representative of the initial frequency of the sweep and to a number representative of the slope of the sweep, respectively, the remaining accumulators may be set to zero.

It may be appreciated that the accumulators which are set to zero in the examples given may be dominated from the respective circuits.

It may further be appreciated that other sinusoidal waveforms may be generated by the apparatus of the embodiment illustrated in FIG. 2 by the appropriate choice of the approximating polynomial function of time with corresponding initial values.

It may yet further be appreciated that the resolution of the output waveform is dependent on the rate of the clock signal provided by clock source 18. In order to increase the resolution of the output waveform without an attendant increase in the frequency of the clock signal, a linear interpolator 40 may be interposed between the difference equation computer 30 and the memory 20. The linear interpolator 40 provides linear approximations between the points of the polynomial provided by the computer 30. The interpolator 40 comprises an accumulator 41 which is coupled to receive the number stored in the accumulator 31 via an AND-gate 44 at the beginning of each iteration of the computer 30. The transfer of the number from the accumulator 31 via the AND-gate 44 is controlled by a transfer signal that enables the AND-gate 44 at the beginning of each iteration. A storage register 42 is similarly coupled to receive the first difference number stored in the accumulator 32 via an AND-gate 45 diminished by a factor of K by means of a conventional dividing circuit 43. The factor K may conveniently be chosen to be a power of two thereby permitting the dividing circuit 43 to be instrumented as a simple shifting circuit in binary embodiments of the present invention. The accumulator 41 is coupled to the storage register 42 via an AND-gate 46 in order to accumulate the number stored in the register 42. The AND-gate 46 is blocked by the inverted transfer signal at the beginning of each iteration so that the transfer of numbers from the computer 30 to the interpolator 40 may be accomplished. The accumulator 41 provides the high resolution linearly interpolated phase function to the memory 20.

In operation, the numbers stored in the accumulators 31 and 32 at the beginning of each iteration are transferred in the manner described to the accumulator 41 and the register 42 respectively. The accumulation rate of the accumulator 41 is controlled by the clock signal from the clock source 18. Since the difference equation computer 30 operates at a rate diminished by a factor of K with respect to the interpolator 40, the interpolator 40 provides K linearly disposed points between adjacent pairs of points provided by the computer 30. In the operation previously described of the difference equation computer 30, the first difference stored in the accumulator 32 is added to the number stored in the accumulator 31 during each iteration. In the operation of the interpolator 40, 1/K of the first difference is added K times to the accumulator 41 during each iteration thus generating K interpolated points of the polynomial.

It is appreciated from the foregoing that the waveform generator of FIG. 2 may be utilized with or without the interpolator 40. When the device is used without interpolation, the output of the accumulator 31 of the difference equation computer 30 is directly connected to address the memory 20. When interpolation is desired, the accumulator 41 of the interpolator 40 is directly connected to address the memory 20 as shown. Although it is understood that these alternative configurations are within the scope of the present invention, FIG. 2 is arranged as illustrated for simplicity and brevity.

It may be appreciated that an alternative embodiment of the invention may be realized by computing the points of the polynomial provided to the interpolator 40 in an off-line general purpose digital computer and storing these data in a buffer memory for application to the registers of the interpolator 40.

It may further be appreciated that the arithmetic operations described herein above may be performed in serial or parallel fashion utilizing, respectively, appropriate serial or parallel instrumentations of the gates, registers, and accumulators for the device.

It may yet further be appreciated that the memory 20 may be embodied as a conventional addressable read-write memory, a convention read-only permanently wired memory, or digital wired logic network, or the like, for performing the required function.

Although the present invention has been described in terms of generating sinusoidal waveforms, it may be appreciated that other waveforms may be generated by inserting appropriate sets of functional values in the tables stored in the memory 20.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A digital waveform generator comprising
   difference equation computer means for providing first signals representative of the first sequence of values of a polynomial function of time,
   presetting means for setting said computer means with predetermined initial values, and
   memory means coupled to receive said first signals for providing second signals in response thereto representative of a second sequence of numerical values corresponding to said first sequence in accordance with a predetermined function thereof.

2. Apparatus of the character recited in claim 1 in which said computer means comprises a plurality of digital accumulator means coupled to each other in cascade configuration,
   the number in each accumulator means having combined therewith the number in the preceding accumulator means before being combined with the number in the following accumulator means.

3. Apparatus of the character recited in claim 2 in which said memory means is coupled to receive the signals provided by the last accumulator means in said cascade configuration.

4. Apparatus of the character recited in claim 2 in which said presetting means includes means for setting the last accumulator means of said cascade configuration with an initial value of said first sequence and the sequentially preceding accumulator means with the initial values of the differences of sequentially increasing order corresponding to said initial value, respectively.

5. Apparatus of the character recited in claim 1 in which said memory means comprises digital memory means coupled to be sequentially addressed by said first signals thereby providing said corresponding second signals.

6. Apparatus of the character recited in claim 1 in which said predetermined function is a sinusoidal function.

7. Apparatus of the character recited in claim 1 further including multiplying means coupled to receive said second signals and a digital signal representative of predetermined numbers for providing the product thereof.

8. A digital waveform generator comprising digital storage means (11) for providing first digital signals representative of a first sequence of numerical values in accordance with the frequency of said waveform,
   digital summation means (13) responsive to said first digital signals and to second digital signals for providing the algebraic sum thereof,
   said second digital signals representative of a second sequence of numerical values varying in accordance with a function of time thereby frequency modulating said waveform in accordance with said function of time,
   accumulator means (15) coupled to said digital summation means for accumulating said algebraic sum of said first and second signals thereby providing third digital signals representative of a third sequence of numerical values in accordance with the phase of said waveform, and
   memory means coupled to receive said third digital signals for providing fourth digital signals in response thereto representative of a fourth sequence of numerical values corresponding to said third sequence in accordance with a predetermined function thereof.

9. Apparatus of the character recited in claim 8 further including means (10, 12) for setting said digital storage means with a predetermined initial value.

10. Apparatus of the character recited in claim 8 in which said memory means comprises digital memory means coupled to be sequentially addressed by said third digital signals thereby providing said corresponding fourth digital signals.

11. Apparatus of the character recited in claim 8 in which said predetermined function is a sinusoidal function.

12. Apparatus of the character recited in claim 8 further including multiplying means (23, 24) coupled to receive said fourth digital signals and a digital signal representative of predetermined numbers for providing the product thereof, thereby amplitude modulating said waveform.

13. Apparatus of the character recited in claim 8 further including means (14) for providing said second digital signals.

14. Apparatus of the character recited in claim 8 further including feedback connection means (19) coupling the output of said digital summation means (13) to the input of said digital storage means (11).

15. A digital waveform generator comprising
    digital storage means (11) for providing first digital signals representative of a first sequence of numerical values in accordance with the frequency of said waveform,
    first digital summation means (13) responsive to said first digital signals and to second digital signals for providing the algebraic sum thereof,
    said second digital signals representative of a second sequence of numerical values varying in accordance with a first function of time thereby frequency modulating said waveform in accordance with said first function of time,
    accumulator means (15) coupled to said first digital summation means for accumulating said algebraic sum of said first and second signals thereby providing third digital signals representative of a third sequence of numerical values in accordance with the phase of said waveform,
    second digital summation means (16) responsive to said third digital signals and to fourth digital signals for providing the algebraic sum thereof,
    said fourth digital signals representative of a fourth sequence of numerical values varying in accordance with a second function of time thereby phase modulating said waveform in accordance with said second function of time, and
    memory means (20) coupled to receive said algebraic sum of said third and fourth digital signals for providing fifth digital signals in response thereto representative of the fifth sequence of numerical values corresponding to said algebraic sum of said third and fourth signals in accordance with a predetermined function thereof.

16. Apparatus of the character recited in claim 15 further including means (14, 17) for providing said second and fourth digital signals.

17. A digital waveform generator comprising
    difference equation computer means for providing first signals representative of a first sequence of values of a polynomial function of time,
    presetting means for setting said computer means with predetermined initial values,
    interpolator means coupled to receive said first signals for providing second signals representative of interpolated values between the values of said first sequence, and
    memory means coupled to receive said second signals for providing third signals in response thereto representative of a third sequence of numerical values corresponding to said interpolated values in accordance with a predetermined function.

18. Apparatus of the character recited in claim 17 in which said computer means comprises a plurality of digital accumulator means coupled to each other in cascade configuration,
    the number in each accumulator means having combined therewith the number in the preceding accumulator means before being combined with the number in the following accumulator means.

19. Apparatus of the character recited in claim 18 in which said interpolator means comprises
- register means coupled to receive a fraction of the number stored in the next to last accumulator means (32) of said cascade configuration,
- accumulator means coupled to receive the number stored in the last accumulator means (31) of said cascade configuration and coupled to accumulate the number stored in said register means,
- first clock means for providing a first clock signal to said accumulator means (41) of said interpolator means for controlling the arithmetic rate thereof, and
- second clock means for providing a second clock signal to said plurality of accumulator means (31-35) of said cascade configuration for controlling the arithmetic rate thereof,
- the rate of said second clock signal being said fraction of the rate of said first clock signal.

20. Apparatus of the character recited in claim 19 in which said memory means is coupled to receive the signals from said accumulator means (41) of said interpolator means.

* * * * *